US012692728B1

(12) United States Patent
Wilkerson

(10) Patent No.: US 12,692,728 B1
(45) Date of Patent: *Jul. 28, 2026

(54) RESTRAINT CLIPS AND METHOD OF USE THEREOF

(71) Applicant: Shaun Wilkerson, River Ridge, LA (US)

(72) Inventor: Shaun Wilkerson, River Ridge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/942,970

(22) Filed: Nov. 11, 2024

Related U.S. Application Data

(63) Continuation-in-part of application No. 17/459,194, filed on Aug. 27, 2021, now Pat. No. 12,163,358.

(60) Provisional application No. 63/071,088, filed on Aug. 27, 2020.

(51) Int. Cl.
*E05B 75/00* (2006.01)
*E05B 67/00* (2006.01)

(52) U.S. Cl.
CPC ............ *E05B 75/00* (2013.01); *E05B 67/006* (2013.01); *E05B 75/005* (2013.01)

(58) Field of Classification Search
CPC ...... E05B 75/00; E05B 75/005; E05B 67/006; Y10T 70/404; Y10T 70/402
See application file for complete search history.

(56) References Cited

U.S. PATENT DOCUMENTS

| | | | | | |
|---|---|---|---|---|---|
| 136,419 | A * | 3/1873 | Craig et al. | E05B 75/00 | 70/17 |
| 465,069 | A * | 12/1891 | Reid | A01K 15/003 | 119/806 |
| 491,642 | A * | 2/1893 | Griffith | A01K 15/003 | 119/806 |
| 829,197 | A * | 8/1906 | Eisaman | E05B 75/00 | 70/17 |
| 885,811 | A * | 4/1908 | Ward | E05B 75/00 | 70/17 |
| 1,014,118 | A * | 1/1912 | Carberry | E05B 75/00 | 70/16 |
| 1,017,955 | A * | 2/1912 | Carney | E05B 75/00 | 232/41 R |
| 1,116,329 | A * | 11/1914 | Russell | E05B 75/00 | 70/17 |
| 1,147,423 | A * | 7/1915 | Murphy | E05B 75/00 | 70/17 |
| 1,157,135 | A * | 10/1915 | Wesson et al. | E05B 75/00 | 70/52 |
| 1,197,549 | A * | 9/1916 | Russell | E05B 75/00 | 70/17 |
| 1,199,100 | A * | 9/1916 | Murphy | E05B 75/00 | 70/17 |
| 1,505,660 | A * | 8/1924 | Moersch | E05B 75/00 | 70/17 |

(Continued)

*Primary Examiner* — Christine M Mills
*Assistant Examiner* — Faria F Ahmad
(74) *Attorney, Agent, or Firm* — Garvey, Smith & Nehrbass, Patent Attorneys, L.L.C.; Julie Rabalais Chauvin; Seth M. Nehrbass

(57) ABSTRACT

The present invention includes an apparatus or device designed for quick and non-violent apprehension and immobilization of suspects and/or prisoners consisting of two quick connect cuffs or clips joined by a retractable cable, thus enabling law enforcement a method for violent-free restraint.

20 Claims, 8 Drawing Sheets

(56) References Cited

U.S. PATENT DOCUMENTS

| | | | | | |
|---|---|---|---|---|---|
| 1,570,458 | A * | 1/1926 | Cederlof | E05B 75/00 | 70/17 |
| 1,634,114 | A * | 6/1927 | Murphy | E05B 75/00 | 70/455 |
| 1,780,473 | A * | 11/1930 | Gill | E05B 75/00 | 70/16 |
| 1,881,577 | A * | 10/1932 | Hillyard | E05B 75/00 | 70/16 |
| 1,950,757 | A * | 3/1934 | Smith-Stange | E05B 75/00 | 119/806 |
| 2,066,654 | A * | 1/1937 | Smith-Stange | E05B 75/00 | 70/17 |
| 2,949,761 | A * | 8/1960 | Mitchell | E05B 75/00 | 128/879 |
| 4,404,822 | A * | 9/1983 | Green | E05B 67/006 | 224/935 |
| 4,530,310 | A * | 7/1985 | Clarke | A01K 27/005 | 463/47.4 |
| 4,543,806 | A * | 10/1985 | Papandrea | E05B 67/006 | 242/380 |
| 5,099,662 | A * | 3/1992 | Tsai | E05B 75/00 | 70/16 |
| 5,230,351 | A * | 7/1993 | Nyorkor | E05B 75/00 | 128/878 |
| 5,400,623 | A * | 3/1995 | Bota | E05B 75/00 | 128/869 |
| 5,469,813 | A * | 11/1995 | Peden | E05B 75/00 | 119/770 |
| 5,482,271 | A * | 1/1996 | McNutt | A01K 97/14 | 119/808 |
| 5,555,751 | A * | 9/1996 | Strickland | E05B 75/00 | 70/16 |
| 5,680,781 | A * | 10/1997 | Bonds | E05B 75/00 | 70/17 |
| 5,752,416 | A * | 5/1998 | Nien | E05B 67/003 | 74/551.8 |
| 6,026,661 | A * | 2/2000 | Spiropoulos | E05B 75/00 | 70/17 |
| 6,092,402 | A * | 7/2000 | Porcelli | A63C 11/005 | 70/58 |
| 6,550,293 | B1 * | 4/2003 | Delegato | E05B 69/00 | 211/4 |
| 7,210,317 | B2 * | 5/2007 | Beane | E05B 75/00 | 128/878 |
| 8,230,706 | B1 * | 7/2012 | Amo | E05B 75/00 | 70/17 |
| 8,307,676 | B2 * | 11/2012 | Irisawa | F41B 15/02 | 70/17 |
| 8,595,904 | B2 * | 12/2013 | Klementowicz, III | E05B 75/00 | 24/17 AP |
| 8,607,742 | B2 * | 12/2013 | Lash | F41H 13/0018 | 119/796 |
| 8,904,832 | B1 * | 12/2014 | Rodriguez | E05B 75/00 | 70/16 |
| 9,038,426 | B2 * | 5/2015 | Flynn | E05B 75/00 | 70/16 |
| 9,828,791 | B2 * | 11/2017 | Lash | F41H 13/0018 | |
| 10,036,184 | B1 * | 7/2018 | Sims | A01K 15/04 | |
| D828,961 | S * | 9/2018 | Moore | D29/120.2 | |
| 10,260,832 | B2 * | 4/2019 | Bowe, Jr. | E05B 19/00 | |
| 11,054,063 | B2 * | 7/2021 | Ratzlaff | F16L 3/1075 | |
| 11,293,203 | B2 * | 4/2022 | Rak | E05B 75/00 | |
| 11,479,994 | B1 * | 10/2022 | Conley | E05B 75/00 | |
| 11,920,383 | B2 * | 3/2024 | Bryan | E05B 75/00 | |
| 12,163,358 | B1 * | 12/2024 | Wilkerson | E05B 75/00 | |
| 2007/0000451 | A1 * | 1/2007 | Goto | F41B 15/02 | 119/802 |
| 2008/0047307 | A1 * | 2/2008 | Kenney | E05B 75/00 | 70/16 |
| 2008/0173048 | A1 * | 7/2008 | Kim | E05B 75/00 | 70/16 |
| 2010/0018263 | A1 * | 1/2010 | Ben Yehuda | E05B 75/00 | 70/275 |
| 2011/0126597 | A1 * | 6/2011 | Irisawa | F41B 15/02 | 70/16 |
| 2012/0085135 | A1 * | 4/2012 | Louden | E05B 75/00 | 70/16 |
| 2013/0133382 | A1 * | 5/2013 | Thompson | E05B 75/00 | 70/431 |
| 2013/0145994 | A1 * | 6/2013 | Lash | A01K 27/009 | 119/796 |
| 2013/0333425 | A1 * | 12/2013 | Krelle | E05B 75/00 | 70/16 |
| 2016/0083980 | A1 * | 3/2016 | Lash | A01K 27/009 | 70/17 |
| 2018/0320417 | A1 * | 11/2018 | Sims | A01K 15/04 | |
| 2019/0338566 | A1 * | 11/2019 | Sims | A01K 15/04 | |
| 2022/0018164 | A1 * | 1/2022 | Walwer | E05B 75/005 | |
| 2024/0044180 | A1 * | 2/2024 | Foy | E05B 75/00 | |

* cited by examiner

RESTRAINT CLIPS AND METHOD OF USE THEREOF

CROSS-REFERENCE TO RELATED APPLICATIONS

This application is a continuation-in-part of U.S. patent application Ser. No. 17/459,194, filed on 27 Aug. 2021, which claims the benefit of U.S. Provisional Patent Application Ser. No. 63/071,088, filed on 27 Aug. 2020, both of which are hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to restraint clips or cuffs for use in suspect or prisoner restraint, such as by law enforcement or security officers (or other individuals). More particularly, the present invention relates to a restraining device for use on the ankles or wrists of a prisoner or suspect.

2. General Background of the Invention

Various methods and devices have been used to restrain and prevent escape of prisoners and suspects by law enforcement and security officers. However, the currently available restraint mechanisms often cause damage or injury to those being restrained, and also put the law enforcement personnel using them in danger when attempting to use them on a suspect or prisoner (or person being taken into custody). Thus, there exists a need for a restraining device that will not cause injury to the prisoner or suspect and allows a law enforcement officer to place the device on the suspect or prisoner without putting himself or herself in harm's way.

The following U.S. Patents and Publications are incorporated herein by reference:

U.S. Pat. Nos. D828,961; 5,099,662; 5,400,623; 5,469,813; 6,026,661; 7,210,317; 8,307,676; 8,595,904; 9,038,426; 2008/0047307; and 2008/0173048.

BRIEF SUMMARY OF THE INVENTION

The apparatus of the present invention includes a device designed for quick and non-violent apprehension and immobilization of suspects and/or prisoners consisting of two quick connect cuffs or clips joined by a retractable cable, thus enabling law enforcement a method for violent-free restraint using the apparatus of the present invention.

The restraining apparatus preferably comprises a pair of cuffs or clips and a retractable cable or attachment. Preferably, each cuff has a pair of spring-loaded arms allowing the cuff to be pushed onto a person's ankle (or wrist), and a back hinge joint that allows the cuff to open completely. Preferably, the pair of cuffs are attached to one another with a retractable cable. The cuffs have a closed position when both the back hinge joint and spring-loaded arms are closed, an open position when the back hinge joint is open, and a push position when the spring-loaded arms are open. Preferably, the cable has a spring mechanism in the center that causes the cable to automatically retract when both cuffs are in the closed position. Preferably, the spring-loaded arms have spring-loaded hinges that allow them to close automatically when pushed onto a person's ankle (or wrist).

In some preferred embodiments of the present invention, the apparatus further comprises a pair of rods that attach to the pair of cuffs (a first rod is attached to a first cuff, and a second rod is attached to a second cuff) when the cuffs are in the open or push position. Preferably, the rod is telescoping and includes a handle with finger grips and a trigger to release the rod from the cuff. Preferably the handle is at the opposite end of the rod from the cuff.

In some preferred embodiments the spring-loaded arms are able to rotate a full 360 degrees through a hollow portion of the cuffs. In this embodiment, the arms preferably can only rotate in one direction.

The present invention also includes a method of restraining a person or preventing escape of a person using the apparatus of present invention. The method includes pushing the pair of cuffs onto a person's ankles or wrists, from the push position, causing the cuffs to close around the person's ankles or wrists in the closed position. This causes the cable to retract completely preventing further ambulation (or movement of wrists) of the person. Where the cuffs are equipped with the rod, the rod can be used to push the cuff onto the person's ankles allowing apprehension without getting closer to the suspect than necessary.

In various alternative embodiments of the present invention, the apparatus of the present invention can be used around a person's wrists.

The present invention includes a restraining apparatus comprising a pair of cuffs or clips and a retractable cable; wherein each cuff or clip has a pair of spring-loaded arms allowing the cuff to be push onto a person's ankle, and a back hinge joint allowing the cuff to open completely; and wherein the pair of cuffs are attached to one another with the retractable cable; and wherein the cuffs have a closed position when both the back hinge joint and spring-loaded arms are closed, an open position when the back hinge joint is open, and a push position the spring-loaded arms are open. The restraining apparatus of the present invention can include the cable having a spring mechanism in the center that causes the cable to automatically retract when both cuffs are closed at the back hinge and the spring-loaded arms. The cable of the apparatus of the present invention can be between about 20 and 24 inches long. The cuffs or clips of the apparatus of the present invention can have padding on the inside/interior surface. The spring-loaded arms of the apparatus of the present invention can have spring-loaded hinges that allow the arms to close automatically when pushed onto a person's ankle. The restraining apparatus of the present invention can include a pair of rods that attach one rod to each of the pair of cuffs when the cuffs are in the open or push position. The rod is preferably telescoping. The rod preferably has a handle with finger grips and a trigger to release the rod from the cuff.

The present invention includes a method of preventing escape of a person and/or restraining a person using the restraint apparatus that includes cuffs/clips. This method can include the following steps: pushing the pair of cuffs/clips onto the person's ankles/wrists; and the cable retracting completely to prevent further ambulation (or restriction of wrists) of the person being detained.

The present invention includes a method of preventing escape of a person and/or detaining a person using the restraint apparatus that includes cuffs/clips and includes the following steps: using the rods to push the pair of cuffs onto the person's ankles; pressing the trigger to release the rods from the cuffs; and the cable retracting completely to prevent further ambulation of the person being detained.

The present invention includes a restraining apparatus comprising a pair of cuffs; and a retractable cable; wherein each cuff has a pair of spring-loaded arms allowing the cuff to be pushed onto a person's ankle (or wrist), and a back hinge joint allowing the cuff to open completely; and wherein the pair of cuffs are attached to one another with the retractable cable; and wherein the cuffs have a closed position when both the back hinge joint and spring-loaded arms are closed, an open position when the back hinge joint is open, and a push position when the spring-loaded arms are open; and wherein the spring-loaded arms are able to rotate 360° through a hollow portion of the cuffs. The present invention includes a restraining apparatus wherein the spring-loaded arms of the cuffs/clips further comprise a ratchet and pawl that prevents the arms from rotating in one direction.

The present invention includes a restraining apparatus comprising a pair of cuffs or clips able to be positioned on a person's ankles; and a cable that is retractable; wherein each cuff has a pair of spring-loaded arms allowing each cuff to be pushed onto one said ankle (or wrist), and a back hinge joint allowing each cuff to open completely; wherein the pair of cuffs are attached to one another with the cable; wherein the pair of cuffs have a closed position when both the back hinge joint and spring-loaded arms are closed, an open position when the back hinge joint is open, and a push position when the spring-loaded arms are open; and wherein the pair of spring-loaded arms have spring-loaded hinges that allow them to close automatically when pushed onto the person's ankles. The restraining apparatus of the present invention can include the cable having a spring mechanism in the center that causes the cable to automatically retract when both cuffs are closed at the back hinge and the spring-loaded arms. The cable can be between 20 and 24 inches long. The cuffs or clips of the present invention can have padding/fabric/cushioning on the inside/interior surface.

The present invention can include cuffs or clips mentioned above and a pair of rods that attach one rod to each of the pair of cuffs when the pair of cuffs are in the open or push position. The rod can be telescoping.

The present invention can include a restraining apparatus comprising a pair of cuffs able to be positioned on a person's ankles (or wrists); and a cable that is retractable; a pair of rods that attach one of the pair of rods to one of the pair of cuffs when the pair of cuffs are in the open or push position; wherein each cuff has a pair of spring-loaded arms allowing each cuff to be pushed onto one said ankle, and a back hinge joint allowing each cuff to open completely; wherein the pair of cuffs are attached to one another with the cable; wherein the pair of cuffs have a closed position when both the back hinge joint and spring-loaded arms are closed, an open position when the back hinge joint is open, and a push position when the spring-loaded arms are open; and wherein each rod has a handle with finger grips and a trigger to release one said rod from one said cuff.

The present invention includes a method of preventing escape of a person (or restraining a person) using the restraining apparatus mentioned herein; the method comprising the following steps: pushing the pair of cuffs onto the person's ankles; and retracting the cable completely, preventing further ambulation of the person.

The present invention includes a method of preventing escape of a person using the restraining apparatus mentioned herein, the method comprising the following steps: (a) using the pair of rods to push the pair of cuffs onto the person's ankles; (b) pressing the trigger to release the pair of rods from the pair of cuffs; and (c) retracting the cable completely, preventing further ambulation of the person.

The present invention includes a restraining apparatus comprising a pair of cuffs or clips able to be positioned on a person's ankles (or wrists); and a cable that is retractable; wherein each cuff has a pair of spring-loaded arms allowing each cuff to be pushed onto one said ankle, and a back hinge joint allowing each cuff to open completely; wherein the pair of cuffs are attached to one another with the cable; wherein each cuff has a closed position when both the back hinge joint and spring-loaded arms are closed, an open position when the back hinge joint is open, and a push position when the pair of spring-loaded arms are open; and wherein the pair of spring-loaded arms are able to rotate 360° through a hollow portion of the pair of cuffs.

The present invention includes a restraining apparatus mentioned here, wherein the pair of spring-loaded arms further comprise a ratchet and pawl that prevents said spring-loaded arms from rotating in one direction. The restraining apparatus of the present invention can include padding on the inside of the cuffs. The cable of the present invention can be between about 20 and 24 inches long.

The present invention can also include the restraining apparatus mentioned herein, further comprising a pair of rods that attach one rod to each of the pair of cuffs when the pair of cuffs are in the open or push position. The rod can be telescoping. The rod can have a handle with finger grips and a trigger to release one said rod from one said cuff.

The present invention can include a method of preventing escape of a person using the restraining apparatus mentioned here, the method comprising:

(a) using the pair of rods to push the pair of cuffs onto the person's ankles (or wrists);
(b) pressing the trigger to release the pair of rods from the pair of cuffs; and
(c) retracting the cable completely, preventing further ambulation of the person.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
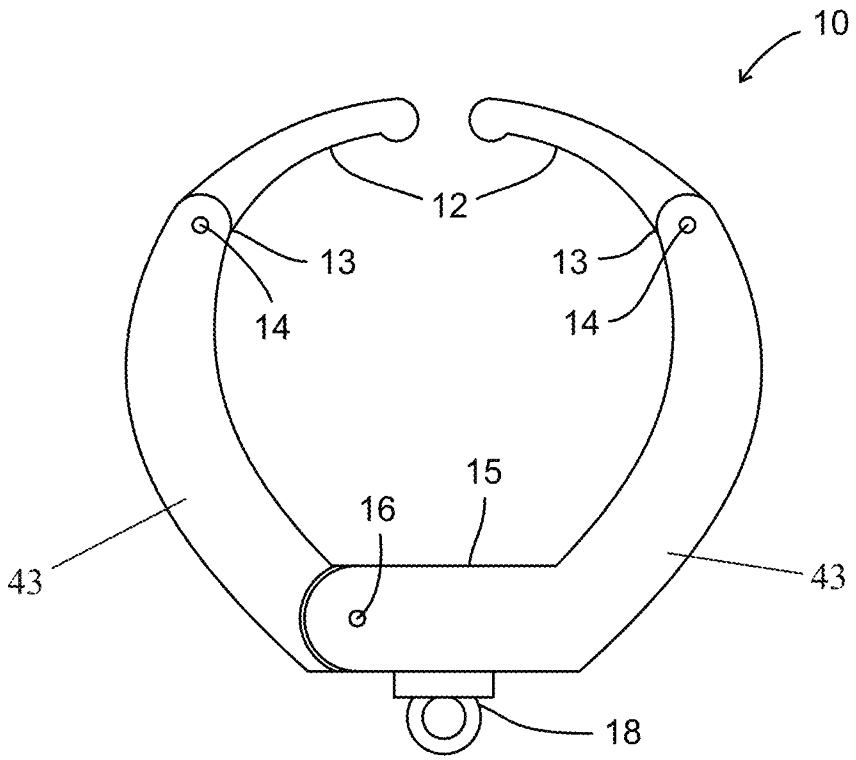
FIG. 1 is a top view of a preferred embodiment of one cuff of the apparatus of the present invention, with the cuff in a closed position.
Figure 2:
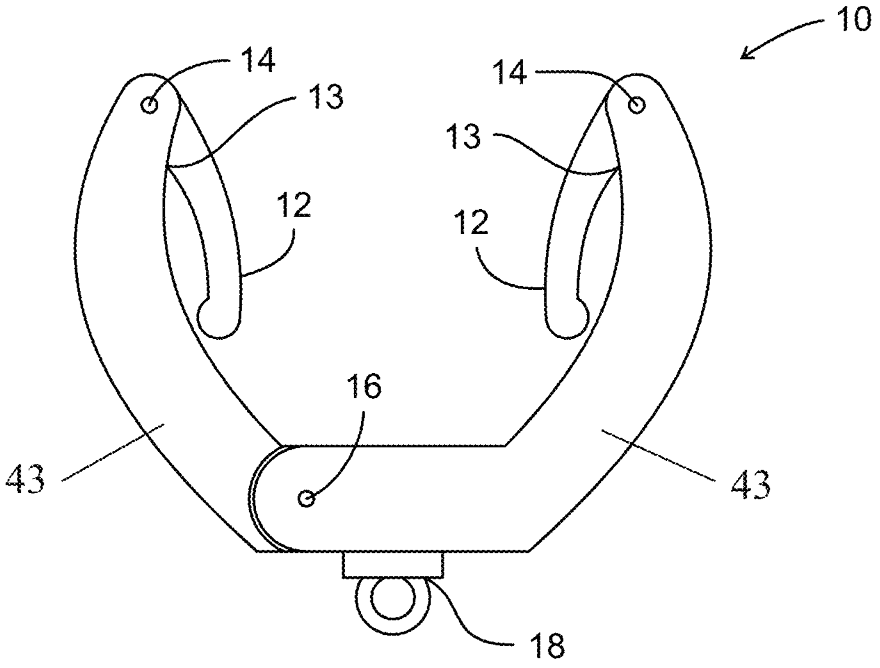
FIG. 2 is a top view of a preferred embodiment of one cuff of the apparatus of the present invention, with the cuff in an open or pushed position.
Figure 3:
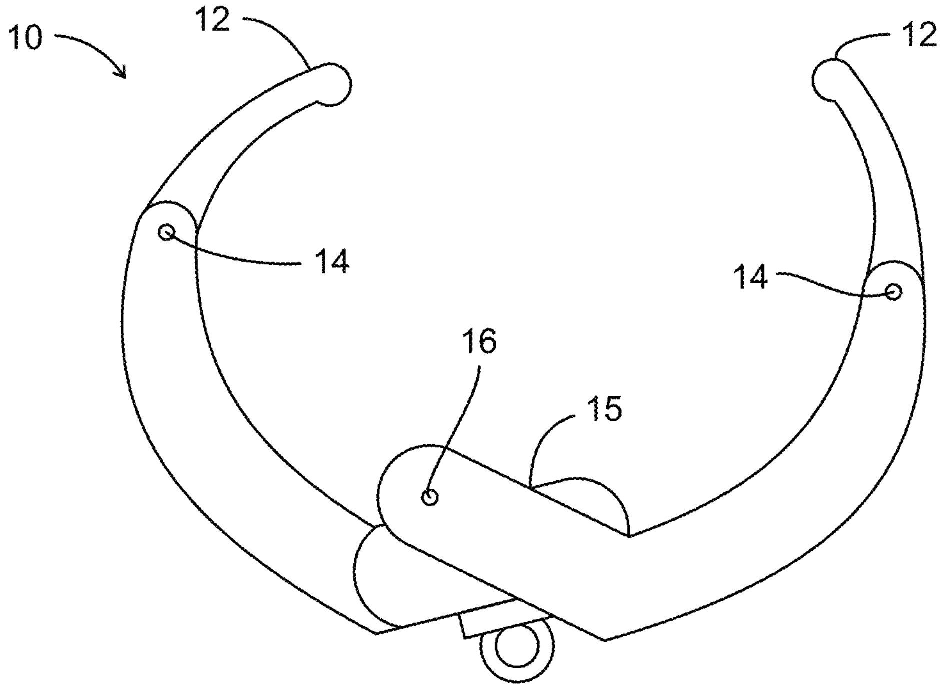
FIG. 3 is a top view of a preferred embodiment of one cuff of the apparatus of the present invention, with the cuff in an unlatched and open position.
Figure 5:
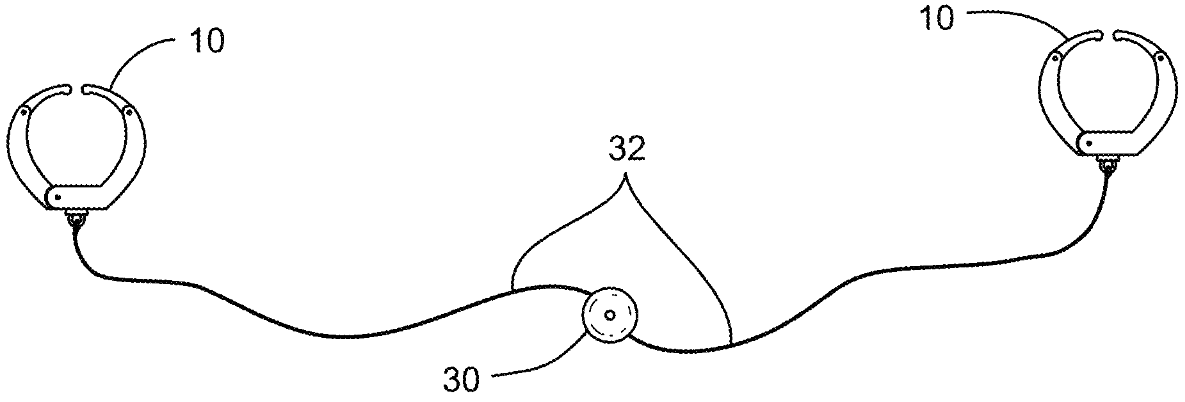
FIG. 5 is a top view of a preferred embodiment of the apparatus of the present invention.
Figure 6:
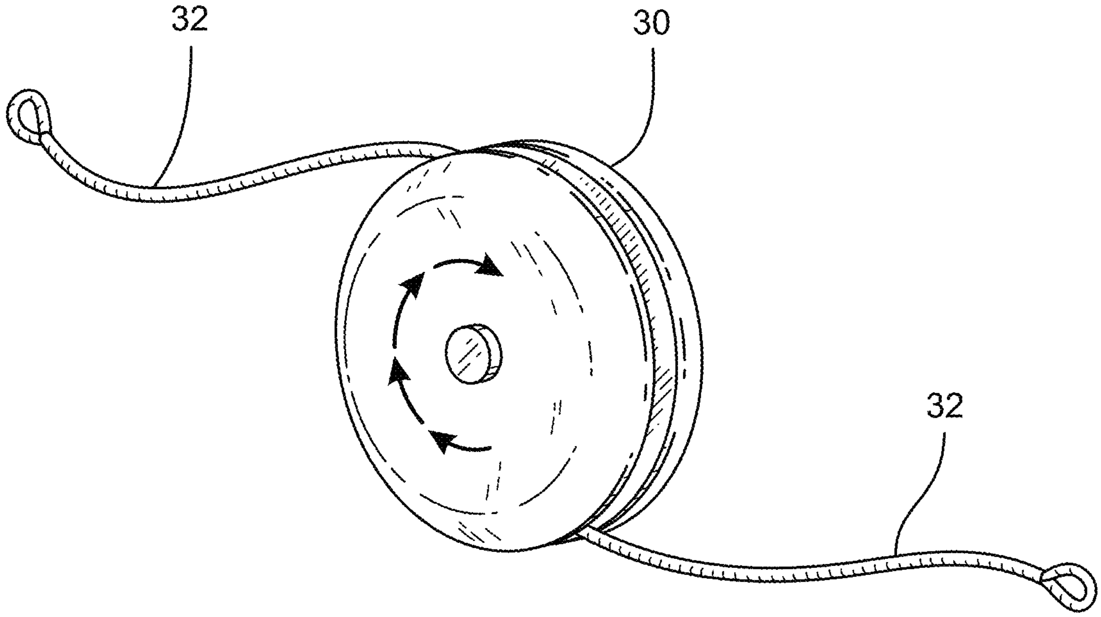
FIG. 6 is a side, perspective view of a preferred embodiment of a spring and cable device of the present invention.
Figure 10:
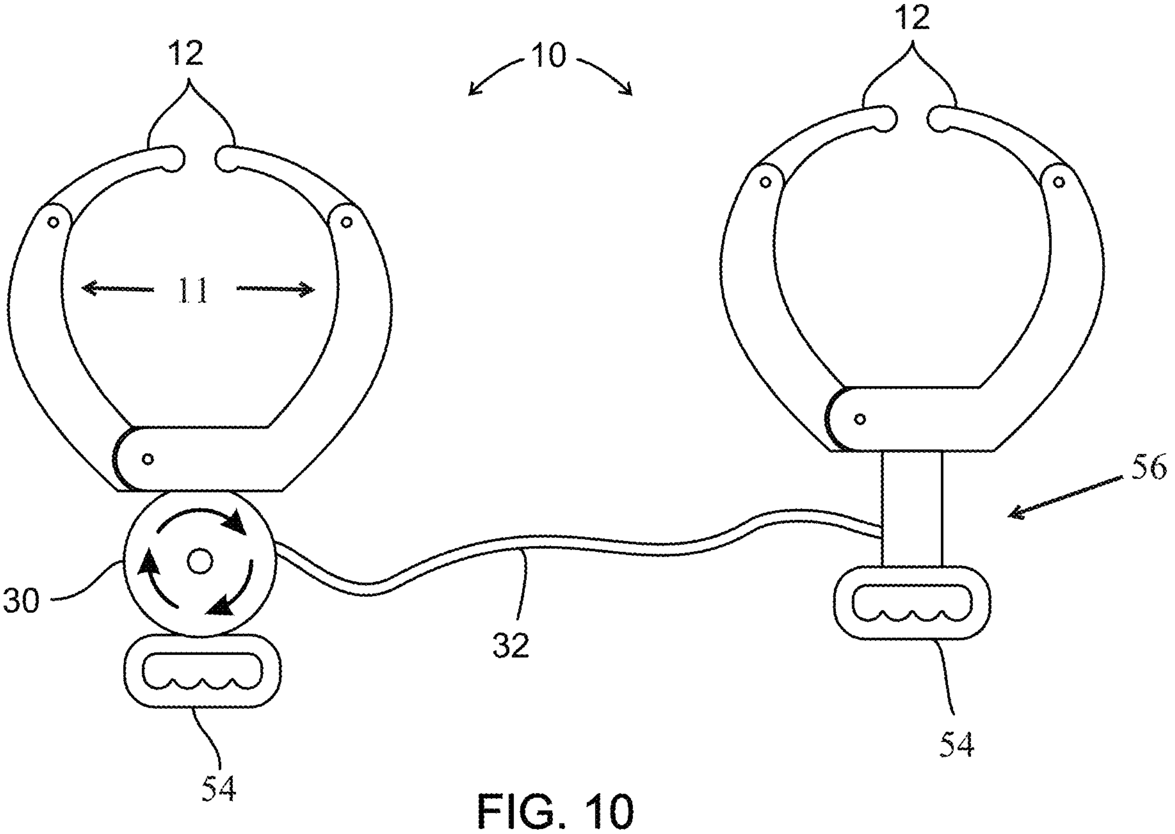
FIG. 10 is a top view of an alternative preferred embodiment of the present invention.

In a preferred embodiment, the apparatus of the present invention preferably includes at least two separate components. Preferably, one component is a matching set of two cuffs or clips 10 that are preferably spring-loaded. Preferably, cuffs 10 are made of a material suitable for restraining a human suspect or prisoner. For example, cuffs 10 can be made of reinforced plastic, aluminum, or other lightweight metals, such as titanium or magnesium; however, any suitable materials could be used. Preferably, cuffs 10 have a diameter 11 (shown in FIG. 10, for example) suitable for encompassing a human ankle (or wrist) when in the closed position shown in FIGS. 1, 7, 10, and 11, for example. More preferably, diameter 11 is about 6 inches; most preferably, diameter 11 is 4 inches. However, other suitable sizes of cuffs may be used, including those suitable for ankles and wrists of males, females, and juveniles. Diameter 11 can be sized and shaped to accommodate any size wrist and/or ankle of an individual. Preferably, cuffs 10 are used on a suspect's ankles, though they could also be used on a suspect's wrists. One of these cuffs 10 can be seen in FIGS. 1-3, 7, 8, and 11 and show primary curved portions 43 and secondary curved portions 12. Preferably, the apparatus of the present invention comprises a set of two of these cuffs 10 as shown in FIGS. 5 and 10, for example. Preferably, cuffs 10 are padded (not shown). Preferably, cuffs 10 can be clipped to a suspect's ankles (or wrists) simply by pushing the device onto the ankles (or wrists). FIG. 2 shows cuff 10 in its push position ready to be pushed onto a suspect's ankle (or wrist), wherein spring-loaded arms or extensions 12 are open at front hinges 13, and back hinge 15 is closed. Two spring-loaded arms 12 can preferably push inward at front hinges 13 about cuff pins 14 allowing cuff 10 to surround an ankle (or wrist). Front hinges 13 are preferably spring-loaded so that arms or secondary curved portions 12 automatically close around the ankle (or wrist) of an individual. This reduces the time and effort required to cuff a suspect. Preferably, cuffs or clips 10 are also hinged at back hinge 15 and can be opened by a keyed release at connection 18, using keyhole for unlocking mechanism 16. Preferably, connection 18 is a ball/socket connection. FIG. 3 shows cuff 10 open at hinge 15. This keyed release simplifies releasing/opening/unlocking the cuffs 10 from around the suspect's ankles or wrists.

Figure 4:
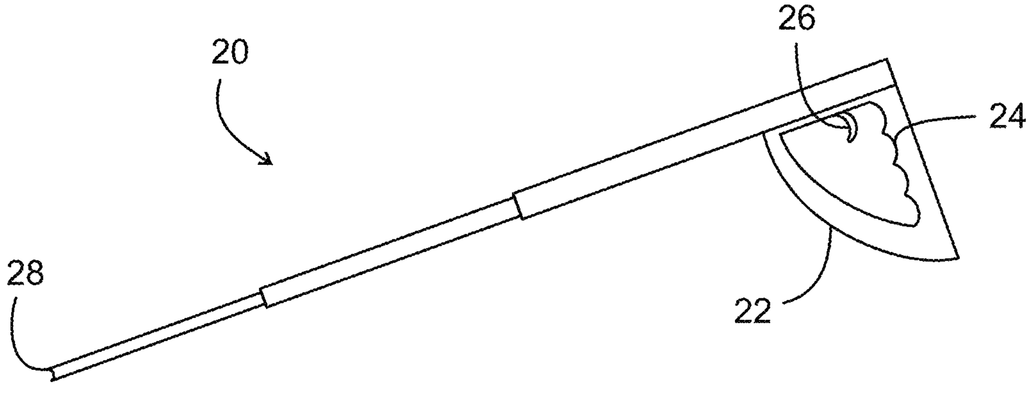
FIG. 4 is a top view of a preferred embodiment of the rod of the apparatus of the present invention.

In various preferred embodiments of the present invention, placing cuffs 10 on an individual's wrists and/or ankles can be achieved by using rod 20, a preferred embodiment of which is shown in FIG. 4. Rod 20 is preferably telescoping. In some preferred embodiments of the present invention, the apparatus of the present invention can include a pair of rods that attach to the pair of cuffs (a first rod is attached to a first cuff, and a second rod is attached to a second cuff). A pair of rods 20 can be attached to a pair of clips 10 when cuffs 10 are in the open or push position. Preferably, rod 20 is of a length suitable to allow a user or law enforcement official to place the cuffs 10 on a suspect's or prisoner's ankles or wrists without the user placing him or herself in harm's way. For example, the rod could be 4-6 feet in length, preferably, 2-4 feet in length, and most preferably, 1-3 feet in length. Preferably, the rod is made of reinforced plastic, aluminum, or other lightweight metals, such as titanium or magnesium; however any suitable materials could be used. Preferably, rod 20 has handle guard 22 on the end. Preferably, the handle has handle grip 24 and trigger release 26. In various preferred embodiments of the present invention, use of rod 20 can include a user or law enforcement official holding rod 20 by handle grip portion 24 and attaching connector or end 28 to connection 18 on cuff 10. Connector 28 is preferably a socket connector. Connector 28 of rod 20 can be attached to the cuff 10 at connection 18 by any number of methods, including ball and socket joint (as shown), trigger release system, or other suitable means. Preferably, immediately upon cuffing the suspect, the rods 20 can be programmed to release from cuffs 10. In various alternative preferred embodiments, rods 20 can be released from connections 18 of cuffs 10 by trigger 26 at handle 22. More specifically, user of rod 20 can pull or activate trigger 26 which releases connector 28 from connection 18.

In various alternative preferred embodiments, the present invention can also include connecting cable 32 attached to each cuff 10 as shown in FIGS. 5 and 10. Preferably, cable 32 is a vinyl-coated steel cable; however, any suitable material could be used. Preferably, cable 32 is about 48 inches in length, more preferably it is about 32 inches in length, and most preferably, it is about 22 inches in length; however, any suitable length could be used. Connecting cable 32 preferably has a concentric spring-loaded retractor 30 in the middle which is programmed to activate the spring once the two cuffs 10 are applied or placed onto an individual's wrists or ankles (see FIG. 5). Preferably, spring-loaded retractor 30 uses constant coil spring and yawl stops. Self-retracting lifeline mechanisms similar to those found on industrial safety harness devices are also a possibility for joining the two cuffs 10 together. Preferably, spring-loaded retraction device 30 is about 2-4 inches in diameter, more preferably, it is 3 inches in diameter, and most preferably 2.5 inches in diameter; however, any suitable diameter could be used.

Preferably, spring-loaded retractor 30 is constantly set to retract once both cuffs 10 are applied/secured around an individual's wrists or ankles. In the "relaxed" position shown in FIG. 5, the full extension of the cable is preferably approximately 20-24 inches. Once activated, cables 32 preferably retract fully, bringing the suspect's ankles or wrists together. (This activated position of the cable is not shown in the figures). During non-confrontational arrests, spring retractor 30 can preferably be disabled. Preferably, the spring 30 is disabled remotely by a Bluetooth device or other suitable remote control device, thus rendered inactive to retract, thus enabling the suspect to walk comfortably. If a suspect is cuffed in the "relaxed" position and then attempts to escape by running, the Bluetooth or remote control device can preferably be quickly activated by the arresting officer which retracts cables 32 and renders the suspect unable to continue on foot.

Figure 7:
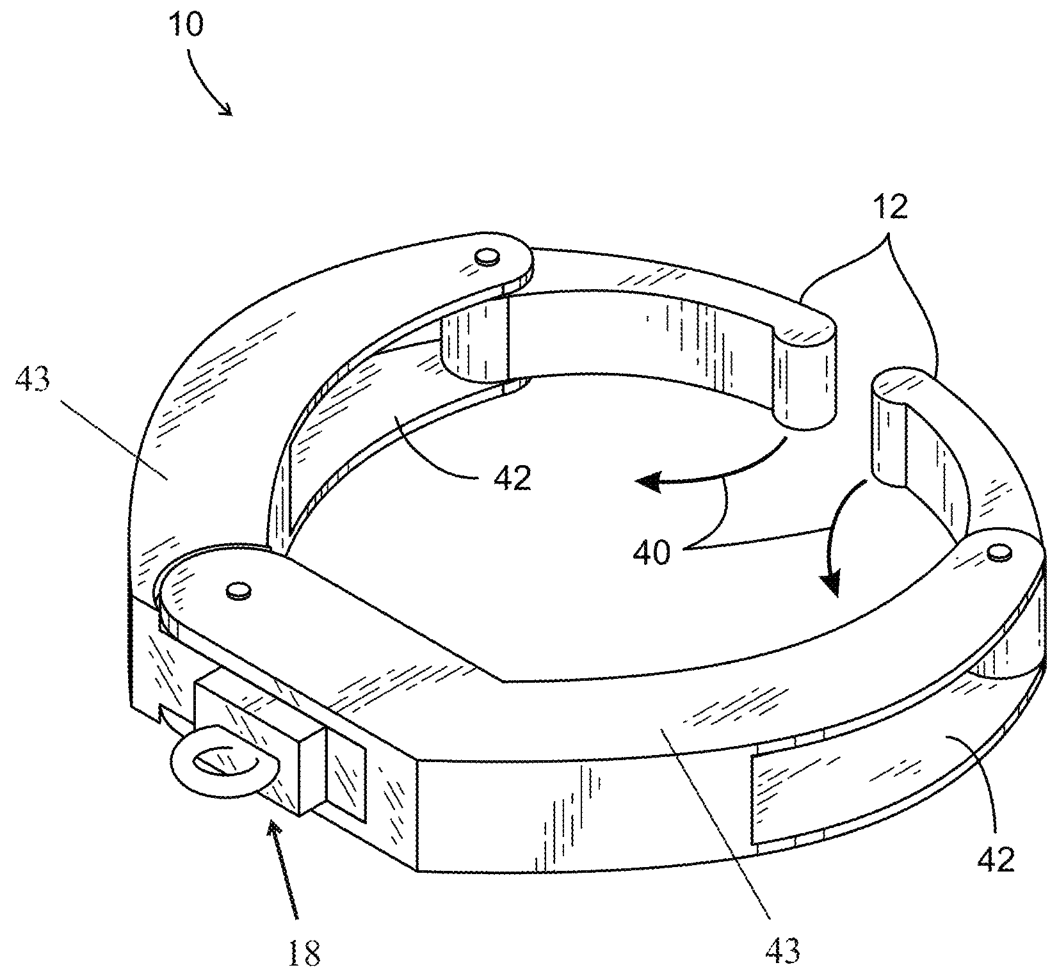
FIG. 7 is a perspective view of a preferred embodiment of a cuff of the apparatus of the present invention, with the cuff in a closed position.
Figure 8:
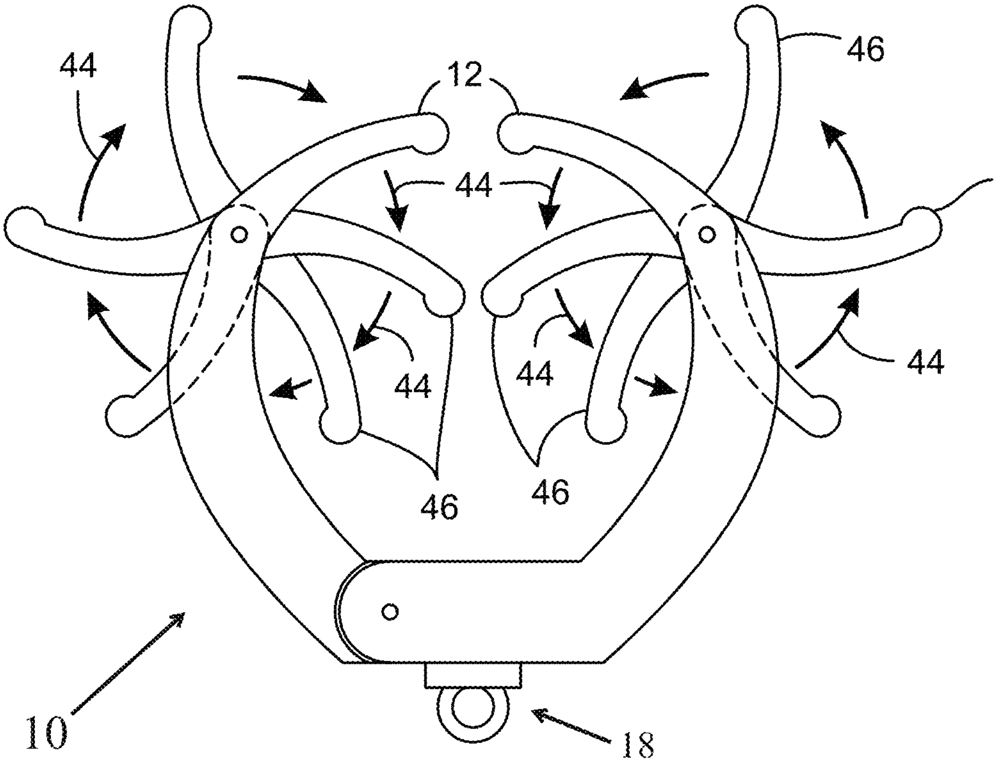
FIG. 8 is top view of a preferred embodiment of a cuff of the present invention.
Figure 9:
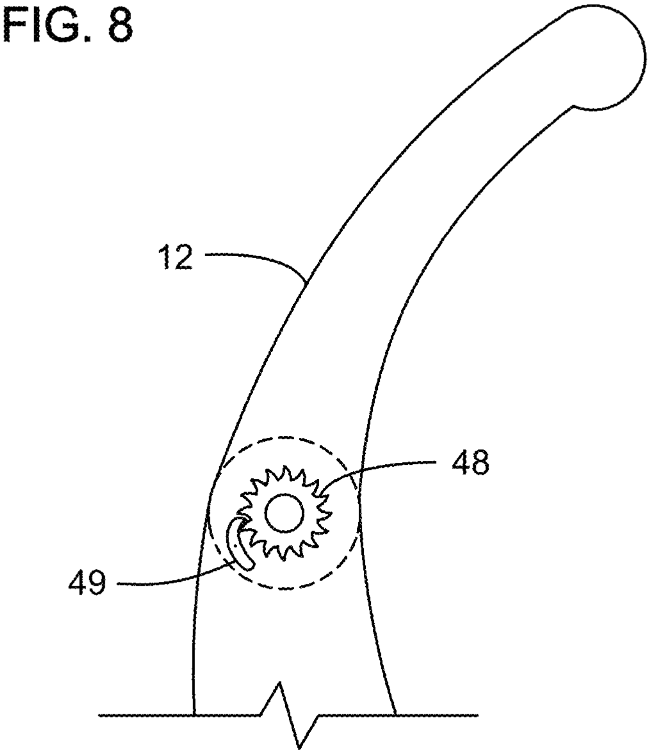
FIG. 9 is close-up view of a preferred embodiment of the release arm of the cuff of the present invention.

In various alternative preferred embodiments of the present invention, spring-loaded arms 12 are solid and are able to passthrough hollow sections 42 of the clamp arms/ primary curved portions 43 as indicated by arrows 40 in FIG. 7. In this embodiment, arms/secondary curved portions 12 are able to pass through openings 42 in a 360-degree arc as shown by arrows 44 and arms 46 in FIG. 8. Additionally, arms 12 preferably have a concentric ratchet 48 with a pawl 49 contained inside, limiting the arm 12 to a one-way motion as shown in FIG. 9. This design renders the cuffs 10 incapable of being pulled open by the prisoner. Rod 20 can be used to place cuffs 10 that include hollow portions 42 onto a suspect's or prisoner's ankles or wrists.

In various preferred embodiments of the present invention, the spring ratcheting device 30 is connected to one of the cuffs 10 as shown in FIG. 10 (instead of being located between the cuffs 30 as shown in FIG. 5). Spring ratcheting device 30 is connected to one cuff 10 and handle grip portion 54 and located between the two. Cuffs 10 are connected to each other with connecting cable 32 which is connected to device 30 on one cuff 10 and handle 56 on the other cuff 10. This embodiment of the present invention reduces the possibility of tangling. Spring ratcheting device 30 in FIG. 10 operates similarly to retractor 30 in FIG. 5.

Figure 11:
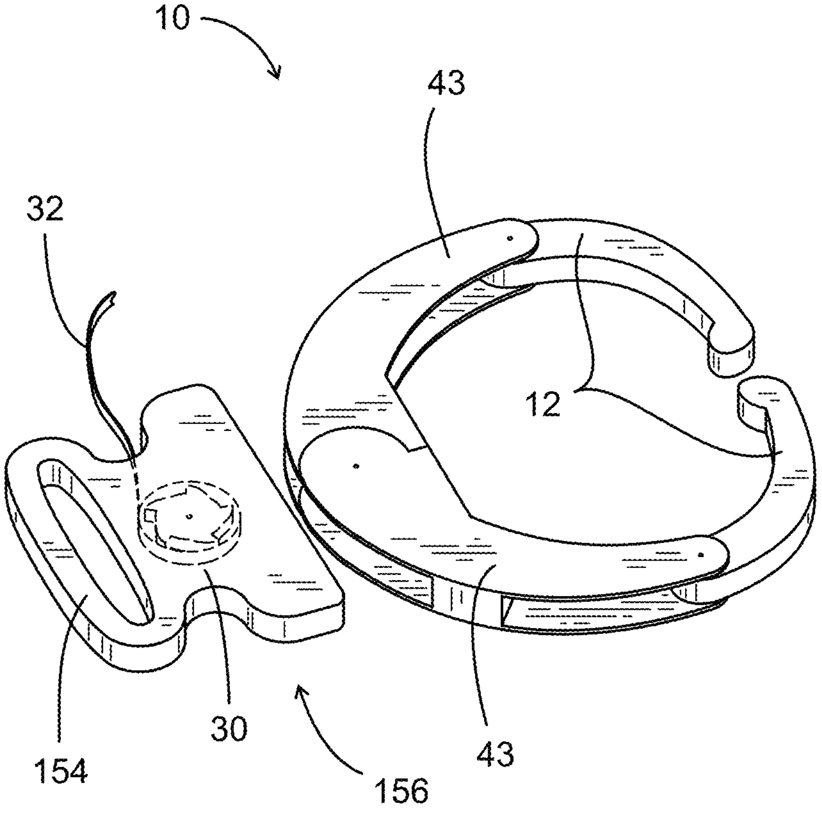
FIG. 11 is a perspective view of an alternative preferred embodiment of the cuff of the present invention.
Figure 12:
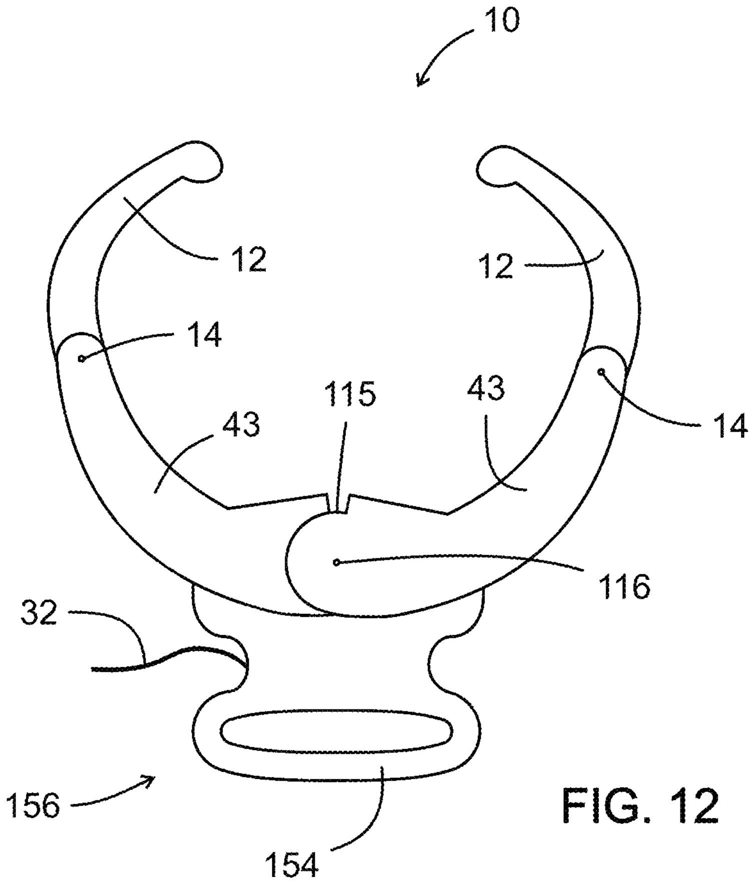
FIGS. 12 and 13 are top views of an alternative preferred embodiment of the present invention.
Figure 13:
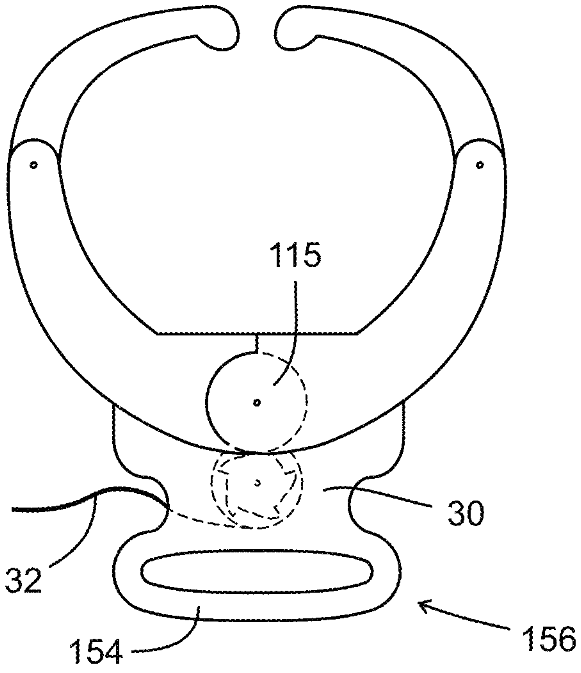

FIGS. 11-13 show various preferred alternative embodiments of the present invention, specifically an alternative configuration of the spring ratcheting device and handle and placement of back hinge 115. FIGS. 11-13 show spring ratcheting device 30 integrated with/part of handle 156. Preferably, ratcheting device 30 is inside of the hollow body of handle 156. Handle 156 also includes handle grip portion 154. Handle 156 slides into/engages with cuff 10 and is secured into place. In a preferred embodiment, when cuffs 10 are in use or about to be in use, handle 156 is engaged with/locked into place in cuff 10. Placement of back hinge 115 and keyhole for unlocking the mechanism 116 of cuff 10 are also slightly different in terms of placement in this embodiment in FIGS. 11-13. Cuff 10 shown in FIGS. 11-13 can be connected to another cuff 10 via connecting cable 32 (similar to FIG. 10). The other cuff would not include ratcheting device 30 (similar to FIG. 10).

PARTS LIST

The following is a list of parts and materials suitable for use in the present invention:

| Parts Number | Description |
|---|---|
| 10 | cuff/clip |
| 11 | diameter of cuff |
| 12 | spring-loaded arm/extension/ secondary curved portion |
| 13 | front hinge |
| 14 | cuff pin |
| 15 | back hinge |
| 16 | keyhole for unlocking the mechanism |
| 18 | connection |
| 20 | rod, preferably telescoping |
| 22 | handle guard |
| 24 | handle grip |
| 26 | trigger release |
| 28 | connector/end |
| 30 | spring-loaded retractor/spring ratcheting device/spring and cable device |
| 32 | cable/connecting cable/line |
| 40 | arrows |
| 42 | hollow section of cuff/opening |
| 43 | cuff arms/clamp arms/primary curved portions |
| 44 | arrow showing 360° movement of arm |
| 46 | arm sections showing 360° movement of arm |
| 48 | ratchet |
| 49 | pawl |

-continued

| Parts Number | Description |
|---|---|
| 54 | handle grip portion |
| 56 | handle |
| 115 | back hinge |
| 116 | keyhole for unlocking the mechanism |
| 154 | handle grip portion |
| 156 | handle |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A restraining apparatus comprising:
a cuff;
wherein the cuff has a pair of spring-loaded arms allowing the cuff to be pushed onto a person's ankle, and a back hinge joint allowing the cuff to open completely; wherein the pair of spring-loaded arms are able to rotate 360° through a hollow portion of the cuff;
wherein the cuff has a closed position when both the back hinge joint and spring-loaded arms are closed, an open position when the back hinge joint is open, and a push position when the spring-loaded arms are open; and
wherein the pair of spring-loaded arms have spring-loaded hinges that allow them to close automatically when pushed onto a person's ankle.

2. The restraining apparatus of claim 1, wherein the cuff has a handle located distally from the spring-loaded arms with a retractable cable located in the handle, wherein the cable is connected to another cuff, and wherein the cable has a spring mechanism in the center.

3. The restraining apparatus of claim 2 wherein the cable is between 20 and 24 inches long.

4. The restraining apparatus of claim 2, wherein said other cuff has a pair of spring-loaded arms allowing the cuff to be pushed onto a person's ankle, and a back hinge joint allowing the cuff to open completely;
wherein said other cuff has a closed position when both the back hinge joint and spring-loaded arms are closed, an open position when the back hinge joint is open, and a push position when the spring-loaded arms are open;
wherein the pair of spring-loaded arms have spring-loaded hinges that allow them to close automatically when pushed onto a person's ankle; and
wherein the spring mechanism of the cable connecting the two cuffs causes the cable to automatically retract when both cuffs are closed at the back hinge and the spring-loaded arms.

5. The restraining apparatus of claim 1 wherein the cuff has padding on the inside.

6. The restraining apparatus of claim 1, wherein the pair of spring-loaded arms further comprises a ratchet and pawl that prevents said spring-loaded arms from rotating in one direction.

7. A method of preventing escape of a person using the restraining apparatus of claim 4, comprising:
pushing the cuffs onto the person's ankles, which causes the cuffs to close automatically and be in the closed position, causing the cable spring mechanism to automatically retract completely, preventing further ambulation of the person.

8. A restraining apparatus comprising:

a cuff, wherein the cuff has a pair of spring-loaded arms allowing the cuff to be pushed onto a person's wrist, and a back hinge joint allowing the cuff to open completely;

wherein the pair of spring-loaded arms are able to rotate 360° through a hollow portion of the cuff;

wherein the cuff has a closed position when both the back hinge joint and spring-loaded arms are closed, an open position when the back hinge joint is open, and a push position when the spring-loaded arms are open; and wherein the pair of spring-loaded arms have spring-loaded hinges that allow them to close automatically when pushed onto a person's wrist.

9. The restraining apparatus of claim 8, wherein the cuff has a handle located distally from the spring-loaded arms with a retractable cable located in the handle, wherein the cable is connected to another cuff, and wherein the cable has a spring mechanism in the center.

10. The restraining apparatus of claim 9, wherein said other cuff has a pair of spring-loaded arms allowing the cuff to be pushed onto a person's wrist, and a back hinge joint allowing the cuff to open completely;

wherein said other cuff has a closed position when both the back hinge joint and spring-loaded arms are closed, an open position when the back hinge joint is open, and a push position when the spring-loaded arms are open;

wherein the pair of spring-loaded arms have spring-loaded hinges that allow them to close automatically when pushed onto a person's wrist; and wherein the spring mechanism of the cable connecting the two cuffs causes the cable to automatically retract when both cuffs are closed at the back hinge and the spring-loaded arms.

11. A method of preventing escape of a person using the restraining apparatus of claim 10, comprising:

pushing the cuffs onto the person's wrists, which causes the cuffs to close automatically and be in the closed position, causing the cable spring mechanism to automatically retract completely, pulling the wrists together of the person.

12. A restraining apparatus comprising:

a pair of cuffs able to be positioned on a person's wrists; and a cable that is retractable;

wherein each cuff has a pair of spring-loaded arms allowing each cuff to be pushed onto one said wrist, and a back hinge joint allowing each cuff to open completely;

wherein the pair of cuffs are attached to one another with the cable;

wherein the pair of cuffs have a closed position when both the back hinge joint and spring-loaded arms are closed, an open position when the back hinge joint is open, and a push position when the spring-loaded arms are open; and wherein the pair of spring-loaded arms have spring-loaded hinges that allow them to close automatically when pushed onto the person's wrists.

13. The restraining apparatus of claim 12 wherein the cable has a spring mechanism in the center that causes the cable to automatically retract when both cuffs are closed at the back hinge and the spring-loaded arms.

14. The restraining apparatus of claim 12, wherein the pair of spring-loaded arms further comprise a ratchet and pawl that prevents said spring-loaded arms from rotating in one direction.

15. The restraining apparatus of claim 12, wherein each cuff has a handle located opposite of the spring-loaded arms.

16. The restraining apparatus of claim 15, wherein the cable has a spring mechanism in the center that causes the cable to automatically retract when both cuffs are closed at the back hinge and the spring-loaded arms, and wherein the spring mechanism is located in the handle of one of the cuffs.

17. The restraining apparatus of claim 16, wherein the pair of spring-loaded arms further comprise a ratchet and pawl that prevents said spring-loaded arms from rotating in one direction.

18. The restraining apparatus of claim 12, wherein the pair of spring-loaded arms are able to rotate 360° through a hollow portion of the cuffs.

19. A method of preventing escape of a person using the restraining apparatus of claim 13, comprising:

pushing the cuffs onto the person's wrists, which causes the cuffs to close automatically and be in the closed position, causing the cable spring mechanism to automatically retract completely, pulling the wrists together of the person and preventing movement.

20. A method of preventing escape of a person using the restraining apparatus of claim 16, comprising:

pushing the cuffs onto the person's wrists, which causes the cuffs to close automatically and be in the closed position, causing the cable spring mechanism to automatically retract completely, pulling the wrists together of the person and preventing movement.

* * * * *